(12) United States Patent
Lee et al.

(10) Patent No.: US 7,764,640 B2
(45) Date of Patent: Jul. 27, 2010

(54) METHOD AND SYSTEM FOR SUPPORTING INTERNET PROTOCOL MOBILITY OF A MOBILE NODE IN A MOBILE COMMUNICATION SYSTEM

(75) Inventors: Sung-Won Lee, Seongnam-si (KR); Dong-Ho Cho, Daejeon (KR); Sun-Ho Lee, Daejeon (KR); Jee-Young Song, Daejeon (KR); Hye-Jeong Lee, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1177 days.

(21) Appl. No.: 10/983,244

(22) Filed: Nov. 8, 2004

(65) Prior Publication Data

US 2005/0117556 A1    Jun. 2, 2005

(30) Foreign Application Priority Data

Nov. 6, 2003    (KR)    ........................ 10-2003-0078482

(51) Int. Cl.
*H04W 4/00*    (2009.01)
(52) U.S. Cl. .................... 370/328; 370/338; 370/349; 709/245
(58) Field of Classification Search ............. 370/395.52
See application file for complete search history.

(56) References Cited

U.S. PATENT DOCUMENTS 7,193,987 B2 * 3/2007 Vilander .................... 370/338
7,395,336 B1 * 7/2008 Santharam et al. .......... 709/227
2002/0045450 A1 * 4/2002 Shimizu et al. .............. 455/442
2002/0067704 A1 * 6/2002 Ton ............................ 370/329

(Continued)

FOREIGN PATENT DOCUMENTS

KR    1020020084828 A    11/2002

OTHER PUBLICATIONS

Johnston et al, SIP Call Flow Examples (draft-ietf-sip-call-flows-05. txt), Jun. 2001, Internet Engineering Task Force, pp. 1,20-23.*

(Continued)

*Primary Examiner*—Rafael Pérez-Gutiérrez
*Assistant Examiner*—German Viana Di Prisco
(74) *Attorney, Agent, or Firm*—Roylance, Abrams, Berdo & Goodman, L.L.P.

(57) ABSTRACT

A method and system for supporting Internet Protocol (IP) mobility of a Mobile Node (MN) in a mobile communication system. In the mobile communication system supporting Mobile IP (MIP) and Session Initiation Protocol (SIP), MIP location registration is performed in a Home Agent (HA) through a first FA (Foreign Agent) of a first foreign network in which the MN is located. When the MN receives a SIP invite message from a Correspondent Node (CN), it sends, to the CN, a SIP response OK message in which a home address of the MN is recorded. The CN sends a packet to the home address of the MN in a state in which a SIP call of the MN is established. The number of signaling messages and a delay time associated with a handover can be reduced, because the CN sends packets only to the home address of the MN regardless of a changed location of the MN.

18 Claims, 14 Drawing Sheets

U.S. PATENT DOCUMENTS

| | | | |
|---|---|---|---|
| 2002/0186688 A1 | 12/2002 | Inoue et al. | 370/352 |
| 2003/0028763 A1 | 2/2003 | Malinen et al. | 713/155 |
| 2004/0105420 A1* | 6/2004 | Takeda et al. | 370/349 |
| 2004/0156346 A1* | 8/2004 | O'Neill | 370/338 |
| 2005/0249176 A1* | 11/2005 | O'Neill et al. | 370/338 |
| 2008/0114898 A1* | 5/2008 | Takeda et al. | 709/245 |

OTHER PUBLICATIONS

Wedlund et al. (Elin Wedlund and Henning Schulzrinne), Mobility Support using SIP, Aug. 1999, Proceedings of the 2nd international workshop on Wireless Mobile Multimedia, pp. 76-82.*

* cited by examiner

| Home Address | Care-of Address | Life time (ms) |
|---|---|---|
| 131.192.180.42 | 129.142.23.42 | 100 |
| 213.123.24.140 | 172.23.142.49 | 150 |
| ... | ... | ... |

FIG.4A
(PRIOR ART)

| User ID | Current Location |
|---|---|
| mina@kaist.ac.kr | 129.142.23.42 |
| minsu@kaist.ac.kr | 172.23.142.49 |
| ... | ... |

FIG.4B
(PRIOR ART)

| Home Address | Care-of Address | Life time (ms) |
|---|---|---|
| 131.192.180.42 | 129.142.23.42 | 100 |
| 213.123.24.140 | 172.23.142.49 | 150 |
| ... | ... | ... |

FIG.12A

| User ID | Home Address |
|---|---|
| mina@kaist.ac.kr | 131.192.180.42 |
| minsu@kaist.ac.kr | 213.123.24.140 |
| ... | ... |

FIG.12B

METHOD AND SYSTEM FOR SUPPORTING INTERNET PROTOCOL MOBILITY OF A MOBILE NODE IN A MOBILE COMMUNICATION SYSTEM

PRIORITY

This application claims the benefit under 35 U.S.C. 119(a) of an application entitled "METHOD AND SYSTEM FOR SUPPORTING INTERNET PROTOCOL MOBILITY OF A MOBILE NODE IN A MOBILE COMMUNICATION SYSTEM", filed in the Korean Intellectual Property Office on Nov. 6, 2003 and assigned Serial No. 2003-78482, the entire contents of which are incorporated herein by reference.

BACKGROUND OF THE INVENTION

1. Field of the Invention

The present invention relates generally to a method and system for supporting Internet Protocol (IP) mobility of a mobile node in a mobile communication system. More particularly, the present invention relates to a method and system for supporting IP mobility of a mobile node using Mobile IP (MIP) and Session Initiation Protocol (SIP) by means of a home address.

2. Description of the Related Art

The support of Internet Protocol (IP) mobility of a Mobile Node (MN) is based on technology by which the MN can receive a packet from a Correspondent Node (CN) without communication cut-off even when it moves outside a home network and is assigned a new IP address in an IP-based packet communication network.

The IP mobility of the MN has been conventionally supported by Mobile IP (MIP) technology defined by the Internet Engineering Task Force (IETF).

FIG. 1 illustrates a conventional packet communication network supporting Mobile Internet Protocol (MIP) and Session Initiation Protocol (SIP).

Referring to FIG. 1, MIP technology supports IP mobility in environments in which a Home Agent (HA) 122 and Foreign Agents (As) 141a and 141b manage a home network 120 and foreign networks 140a and 140b, and Mobile Nodes (MSN) 142a and 142b based on the MIP technology move within a system.

The MNs 142a and 142b have home addresses serving as unique IP addresses assigned by their home network 120. For example, when moving to the new foreign networks 140a and 140b, the MNs 142a and 142b receive Care-of Addresses (CoAS) serving as new IP addresses assigned by the FAs 141a and 141b and register the received assigned CoAs in the HA 122 such that they receive packets from the foreign networks 140a and 140b. In this case, a Correspondent Node (CN) 110 always sends packets to the home addresses of the MNs 142a and 142b, regardless of changed locations of the MNs 142a and 142b.

A packet in which the home address of the MN 142a or 142b is recorded is delivered to the home network 120. The HA 122 then intercepts the packet directed to the home address of the MN 142a or 142b and delivers the intercepted packet to the current CoA of the MN 142a or 142b through IP encapsulation. Accordingly, even when the MN 142a or 142b using the MIP technology moves to a new location, it can maintain seamless packet communication through its unique home address.

As a signaling protocol for processing a multimedia call in an IP-based packet communication network, Session Initiation Protocol (SIP) is adopted and widely used as the standard. The SIP is a protocol for exchanging a control signal to generate and release a multimedia call. Because the number of users desiring to receive an IP multimedia service during movement is increasing, a large amount of research is being performed on technology for supporting IP mobility of MNs by extending the SIP without using a special mobility support protocol.

When the MN using the SIP exits the home network and moves to a foreign network, new location information is registered in a SIP proxy server. Accordingly, after the MN moves to a new location, the SIP proxy server informs the CN of MN location information, such that a SIP call can be established between the CN and the MN. When the location of the MN is changed while communication is in progress, the CN can send a packet to a new location of the MN if the MN sends a new IP address, indicating the changed location, recorded in a contact field of a SIP re-invite message header.

However, even when the location of the MN is changed, the SIP takes into account only a state in which the location of the MN is fixed while a multimedia call is established. Accordingly, the SIP can support the IP mobility while the MN does not perform a communication function, but has a limitation in supporting IP mobility while the MN performs communication. That is, when the MN moves to a new foreign network while communication is in progress and is assigned a new IP address in addition to a previous IP address, it is difficult for a call in progress to be reestablished after an additional control signal is exchanged such that a connection-based call in a Transmission Control Protocol (TCP) layer higher than an IP layer is supported. Moreover, it is difficult for a special TCP monitoring agent to be implemented in the MN and the CN.

Therefore, it is predicted that most of the MNs will use both the MIP for IP mobility and the SIP for processing an IP multimedia call in the next generation packet communication network. In this case, when the MN moves to a new location from the network and is assigned a new IP address, a location registration process is performed in the MIP and subsequently a location registration process is additionally performed in the SIP. Accordingly, there is a problem in that the location registration process must be repeatedly performed. When mobility of the MN is high and a connection point on the network is frequently changed, there are other problems in that battery power consumption of the MN is high due to the frequent location registration process, and limited wireless resources are inefficiently used because control signaling increases in a wireless zone of a wireless packet communication system.

FIG. 2 is a flow chart illustrating operation of a MN using both MIP and SIP.

When the MN receives applied electric power or moves to a new location, it receives an agent advertisement message from a Foreign Agent (FA) in step 201. The MN is assigned a new CoA through MIP location registration and registers the new CoA in a Home Agent (HA) in step 202. When the MIP location registration is terminated, the MN performs a SIP location registration process in step 203, and waits in a standby state in step 204. When receiving a SIP invite message from a CN through a SIP proxy server in step 204, the MN sends a SIP response OK message in step 205. The CoA indicates that the current location of the MN is recorded in a contact field of the SIP response OK message.

Subsequently, when a SIP call is established between the MN and the CN, a packet is transmitted and received in step 206. When the SIP call is terminated, the MN returns to the standby state in step 204. However, when the MN moves to a new location and a handover is performed while packet communication is in progress, that is, the SIP call is in progress, in step 206, the MN receives an agent advertisement message from a FA in step 207, and is assigned a new CoA through the MIP location registration process in step 208. The MN registers its own location in a MIP based HA. After the MIP location registration, the MN sends a SIP re-invite message to the CN, informs the CN of the new CoA, and continuously exchanges a packet of the SIP call in progress with the CN in step 209.

After sending the SIP re-invite message to the CN, the MN performs a special SIP location registration process in the SIP proxy server.

FIG. 3 is a flow chart illustrating a process in which an MN is assigned a new IP address and registers a new location when moving to a foreign network outside a home network in the conventional packet communication network.

When the MN exits the home network and moves to the foreign network, it receives an agent advertisement message periodically broadcast by a FA A located in the foreign network in step 301. Subsequently, the MN is assigned a new CoA serving as a new IP address to be used in the foreign network and makes a location registration request by sending a MIP registration request message to the FA A in step 302.

In step 303, the FA A sends the MIP registration request message to a HA and makes a request for location registration of the MN. Accordingly, the HA stores the new CoA of the MN and then sends a MIP registration reply message to the FA A in step 304. Subsequently, the FA A delivers the MIP registration reply message to the MN in step 305.

When the MIP location registration process is terminated, the MN performs a SIP location registration process to inform a SIP proxy server of the new CoA to be used to receive a packet. That is, the MN requests that the SIP proxy server register the current location of the MN through a SIP registration message in step 306. Then, the SIP proxy server stores location information of the MN and indicates that the SIP location registration process is successful through a SIP response OK message in step 307.

FIGS. 4A and 4B illustrate the structures of conventional databases for storing subscriber-by-subscriber location information in a MIP based HA and a SIP proxy server.

As illustrated in FIG. 4A, subscriber-by-subscriber location information in the MIP-based HA is managed in the form of a table including an MN's home address, a CoA and a valid lifetime or duration of the CoA. As illustrated in FIG. 4B, a SIP user Identification or Identifier (ID) and a CoA serving as current location information of a user reported to the SIP proxy server when SIP location registration is performed are recorded as subscriber-by-subscriber location information in the SIP proxy server.

FIG. 5 is a flow chart illustrating a conventional process for establishing a SIP call from a CN to an MN.

In step 501, the CN sends a SIP invite message to a SIP proxy server in order to establish the SIP call directed to the MN with which the CN desires to communicate. In step 502, the SIP proxy server delivers the SIP invite message to a CoA of the MN registered in the SIP proxy server. In step 503, the MN sends a SIP response OK message to the SIP proxy server when receiving the SIP invite message. In step 504, the SIP proxy server sends the SIP response OK message to the CN. At this point, the MN records the CoA of the MN in a contact field of a header of the SIP response OK message such that the CN can identify the current location of the MN from the SIP response OK message. Through the above-mentioned process, the SIP call is established between the CN and the MN, such that the CN and the MN can transmit and receive a packet without intervention of an agent.

FIG. 6 is a flow chart illustrating a conventional process for supporting mobility of a MN when a call is transferred from a foreign network A to a foreign network B while the MN maintains the call in progress.

In steps 601 to 605, when the MN moves from the foreign network A to the foreign network B, it receives an agent advertisement message periodically broadcast by a FA B and performs a MIP location registration process in the FA B. Steps 601 to 605 illustrated in FIG. 6 are identical with steps 301 to 305 illustrated in FIG. 3. Accordingly, a description of steps 601 to 605 will be omitted. When the MIP location registration process is terminated, the MN sends a SIP re-invite message and informs a CN of a new CoA serving as new location information of the MN in step 606. The CN sends a SIP response OK message to the MN such that packet transmission and reception associated with a SIP call in progress can be maintained through the new address in step 607.

After a handover operation on the call in progress is performed through the above-described process, the MN performs a location registration process in a SIP proxy server through a special signaling process and registers the new location information in steps 608 and 609.

When the MN using both the MIP and SIP moves to a new location and is assigned a new IP address, it must register the new location information in a MIP-based HA and the SIP proxy server if the MN maintains the conventional MIP and SIP. In this case, there is a problem in that many control messages for location registration must be exchanged. In the conventional method, content registered in the MIP-based HA and content registered in the SIP proxy server all are pertain to the current location information of the MN. Accordingly, there is a problem in that double location registration processes are unnecessarily performed and hence wireless resources are inefficiently used.

When the MN separately performs MIP location registration and SIP location registration according to the prior art, there is an advantage in that a call setup process is simple and its delay is short because both the MIP-based HA and the SIP proxy server can identify the current location of the MN. However, when location registration is frequently performed because mobility of the MN is high, the double location registration processes are ineffective in terms of the MN and the network. More specially, there is a serious problem in that the location registration process is complex when a call is handed over to a new network while the MN maintains the call in progress.

SUMMARY OF THE INVENTION

Accordingly, the present invention has been designed to solve the above and other problems occurring in the prior art. Therefore, it is an object of the present invention to provide a method and system for effectively supporting Internet Protocol (IP) mobility of a Mobile Node (MN) using both Mobile IP (MIP) and Session Initiation Protocol (SIP).

It is another object of the present invention to provide a method and system for supporting IP mobility that minimize double location registration processes of MIP and SIP when a MN moves to a new location and is assigned a new IP address.

In accordance with an aspect of the present invention, the above and other objects can be accomplished by a method for supporting Internet Protocol (IP) mobility of a Mobile Node (MN) in a mobile communication system supporting Mobile IP (MIP) and Session Initiation Protocol (SIP). The method includes performing MIP location registration in a Home Agent (HA) through a first Foreign Agent (FA) of a first foreign network in which the MN is located; sending, to a Correspondent Node (CN), a SIP response OK message in which a home address of the MN is recorded when the MN receives a SIP invite message from the CN; and sending, by the CN, a packet to the home address of the MN in a state in which a SIP call of the MN is established.

In accordance with another aspect of the present invention, the above and other objects can be accomplished by a mobile communication system for supporting Mobile Internet Protocol (MIP) and Session Initiation Protocol (SIP). The mobile communication system includes at least one Home Agent (HA) for storing a home address and a Care-of Address (CoA) mapped to the home address when a location of the MN is registered, and managing a home network; a plurality of Foreign Agents (AS) each assigning the CoA, and managing a foreign network communicating with the home network; and a Mobile Node (MN) for recording its own home address in a SIP response OK message when a SIP invite message is received from a Correspondent Node (CN), and sending the SIP response OK message to the CN.

BRIEF DESCRIPTION OF THE DRAWINGS

The above and other objects, features and other advantages of the present invention will be more clearly understood from the following detailed description taken in conjunction with the accompanying drawings, in which:

FIGS. 4A and 4B illustrate the structures of conventional databases for storing subscriber-by-subscriber location information in a MIP based Home Agent (HA) and a SIP proxy server;

FIGS. 12A and 12B illustrate the structures of databases for storing subscriber-by-subscriber location information in the MIP-based HA and the SIP proxy server in accordance with an embodiment of the present invention;

DETAILED DESCRIPTION OF THE PREFERRED EMBODIMENTS

Embodiments of the present invention will now be described in detail herein below with reference to the accompanying drawings. In the following description, a detailed description of known functions and configurations incorporated herein will be omitted for conciseness.

In accordance with an embodiment of the present invention, any one of a proxy server and a redirect server can be utilized as the Session Initiation Protocol (SIP) server. The proxy server receives a SIP message from a Correspondent Node (CN) to deliver the received SIP message to a current address of a Mobile Node (MN) with which the CN communicates. The redirect server notifies the CN of the current address of the MN such that the CN can directly communicate with the MN. For convenience of explanation, it is assumed herein that the SIP proxy server as illustrated in FIG. 1 is utilized.

Again referring to FIG. 1, a wireless packet communication system includes a CN 110 for performing packet communication with an MN 142a or 142b through an Internet Protocol (IP) network, a SIP proxy server 121 for delivering a SIP message to the MN 142a or 142b and performing SIP location registration of the MN 142a or 142b, a Home Agent (HA) 122 for managing location information of the MN 142a or 142b using Mobile IP (MIP), and Foreign Agents (AS) 141a and 141b for managing the MNs 142a and 142b and foreign networks A and B 140a and 140b and assigning a Care-of Address (CoA) of the MN 142a or 142b using the MIP.

Figure 1:
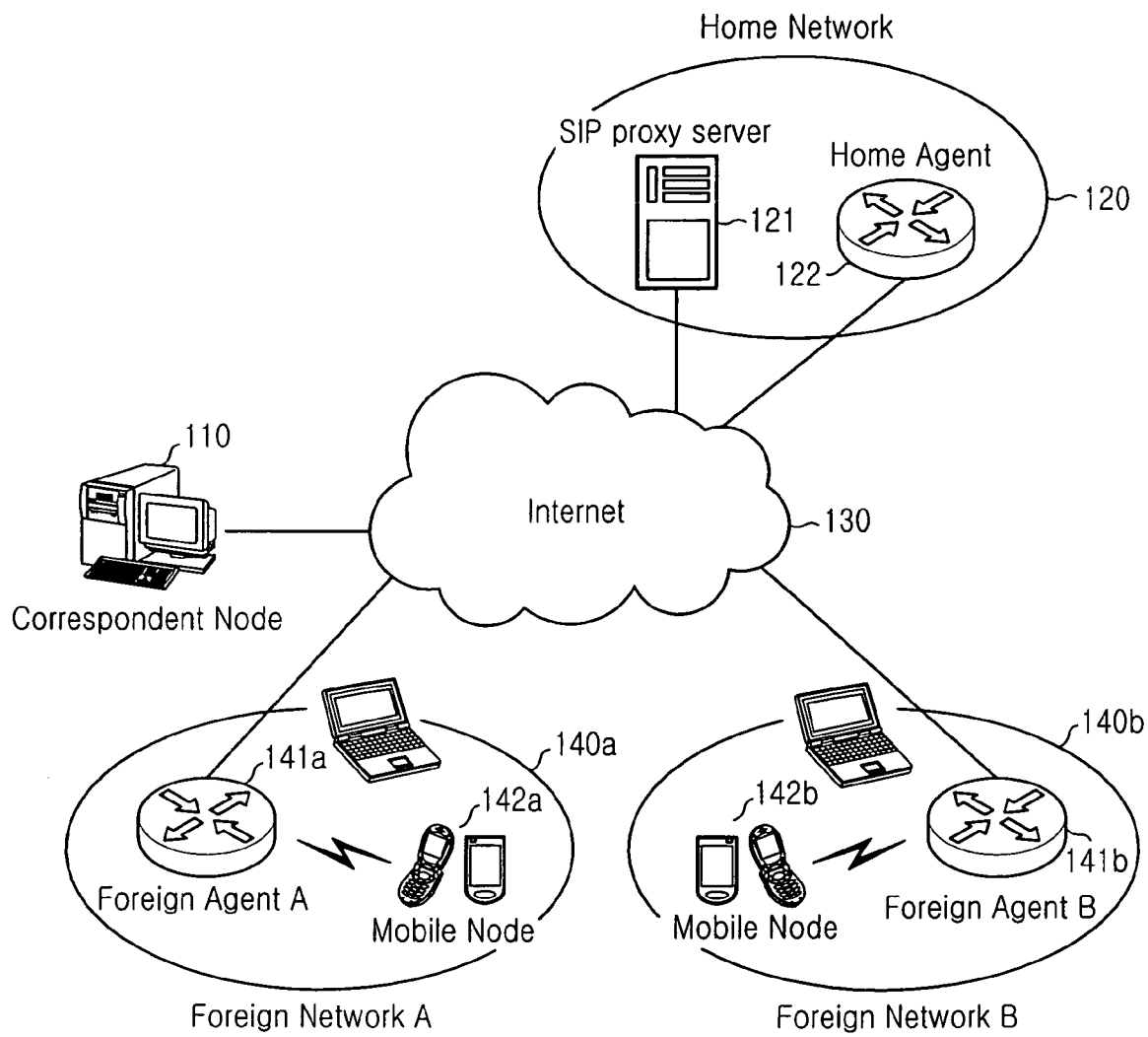
FIG. 1 illustrates the structure of a conventional packet communication network supporting Mobile Internet Protocol (MIP) and Session Initiation Protocol (SIP)

As illustrated in FIG. 1, the MNs 142a and 142b are notebook computers, Personal Digital Assistants (PDAs), mobile communication terminals, etc. that can perform packet communication by accessing a wired/wireless packet communication system while moving to a new location. Operation of the MN in the wireless packet communication system with the above-described network structure will be described with reference to the accompanying drawings.

Figure 7:
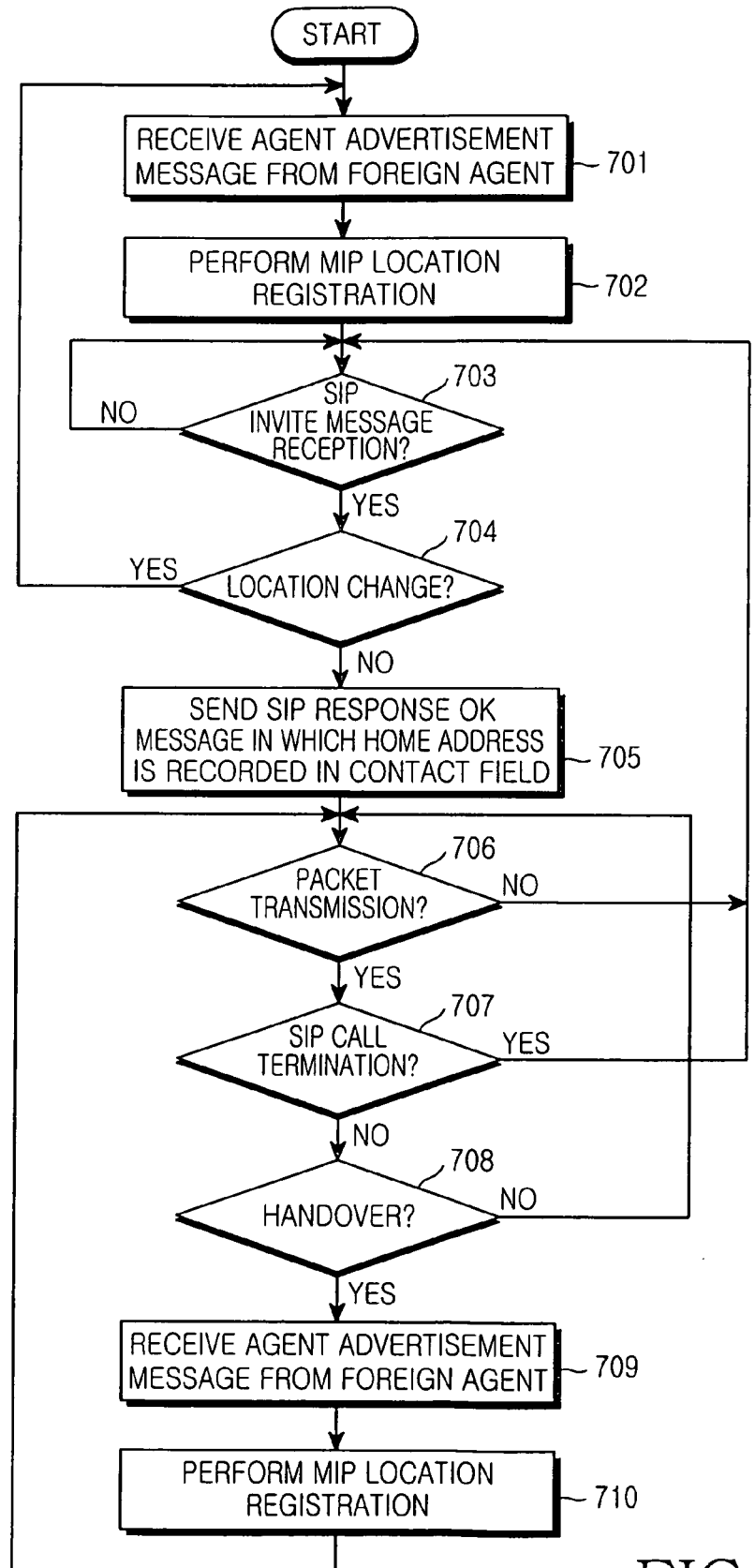
FIG. 7 is a flow chart illustrating an embodiment of operation of a MN for supporting IP mobility in accordance with an embodiment of the present invention.

FIG. 7 is a flow chart illustrating an embodiment of operation of a Mobile Node (MN) for supporting Internet Protocol (IP) mobility in accordance with an embodiment of the present invention.

Figure 2:
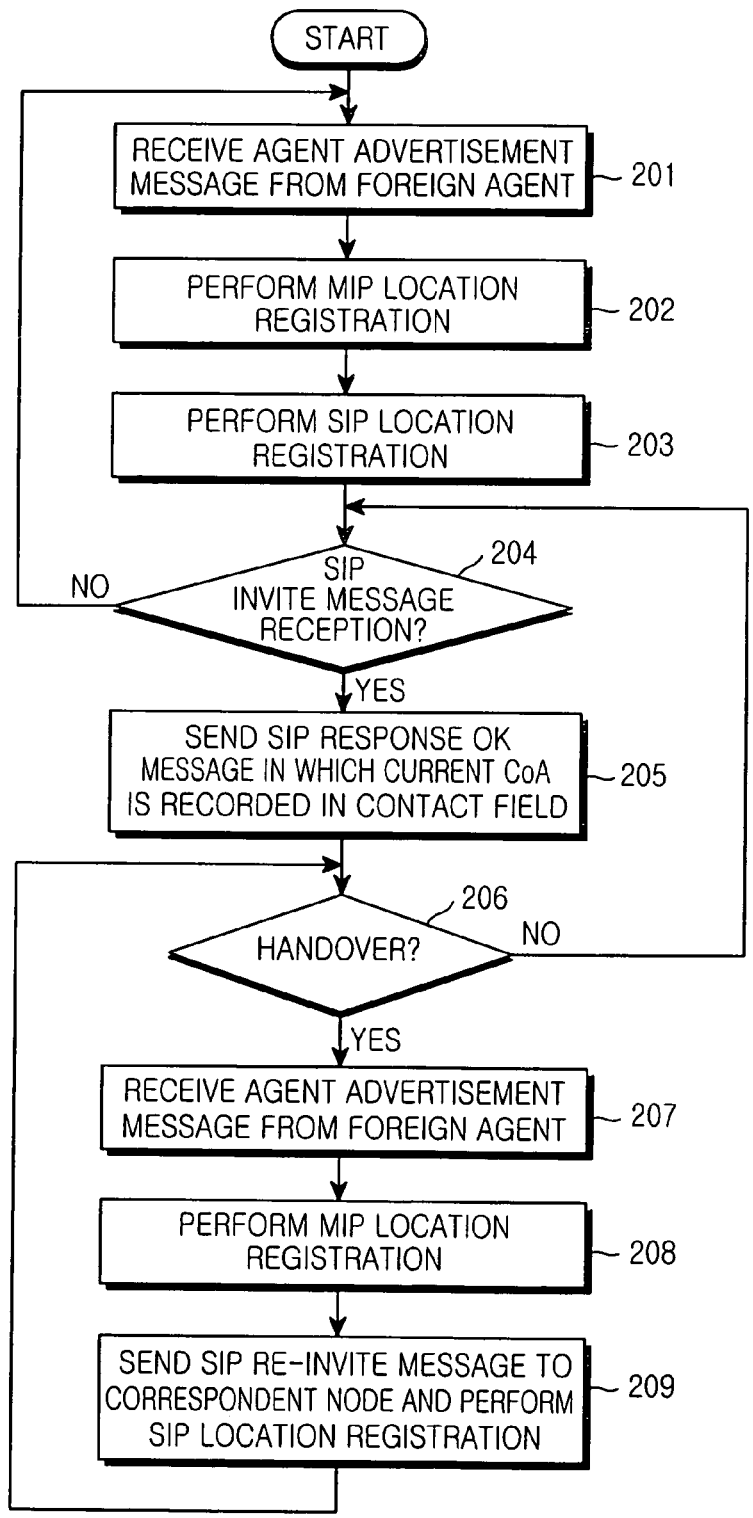
FIG. 2 is a flow chart illustrating operation of a Mobile Node (MN) using both the MIP and SIP in the conventional packet communication network.

When the MN receives applied electric power or moves to a new location, it receives an agent advertisement message from a FA in step 701. The MN is assigned a new CoA through MIP location registration and registers the new CoA in a HA in step 702. At this point, the MN in accordance with an embodiment of the present invention, is different from the MN according to the prior art, and does not perform a special SIP location registration process as in step 203 illustrated in FIG. 2. When the MIP location registration is terminated, the MN determines if a SIP invite message is received in a standby state in step 703.

If a SIP invite message is not received from a CN as a result of the determination in step 703 and the MN moves to a new foreign network, the MN returns to step 701 to re-perform the MIP location registration (not shown in FIG. 7). However, if the MN receives the SIP invite message in step 703 and moves to a new location before SIP call setup in step 704, it returns to step 701. The MN receiving the SIP invite message records, in a contact field of a SIP response OK message, its unique home address rather than its current location, and sends the SIP response OK message to the CN in step 705.

The SIP call is established between the MN and the CN, and a packet is transmitted and received in step 706. The MN determines if the SIP call is terminated in step 707. If the SIP call is terminated, the MN proceeds to step 703. When the MN moves to a new location and a handover is performed while the SIP call and packet communication are in progress in step 708, the MN receives an agent advertisement message from a FA in step 709. After performing a MIP location registration process in step 710, the MN performs the packet communication with the CN in step 706. However, when a handover associated with the MN is not performed in step 708, the MN continuously performs the packet communication with the CN in step 706.

When the MN moves to a new foreign network and performs location registration, the MN in accordance with an the embodiment of the present invention for integrating IP mobility support of the MIP and SIP, performs only a location registration process based on the conventional MIP technology, but does not perform a location registration process based on the conventional SIP technology. That is, a process for registering a location of the MN in a SIP proxy server is performed only in case of personal mobility in which a user is changed by identification card replacement, etc, or in case of service mobility in which service characteristics are changed by a network change. Location registration is not performed in the SIP proxy server in case of terminal mobility in which the location of the MN is changed. Accordingly, the MN is able to simply avoid a SIP location registration process associated with terminal mobility without changing the conventional MIP or SIP technique.

Figure 8:
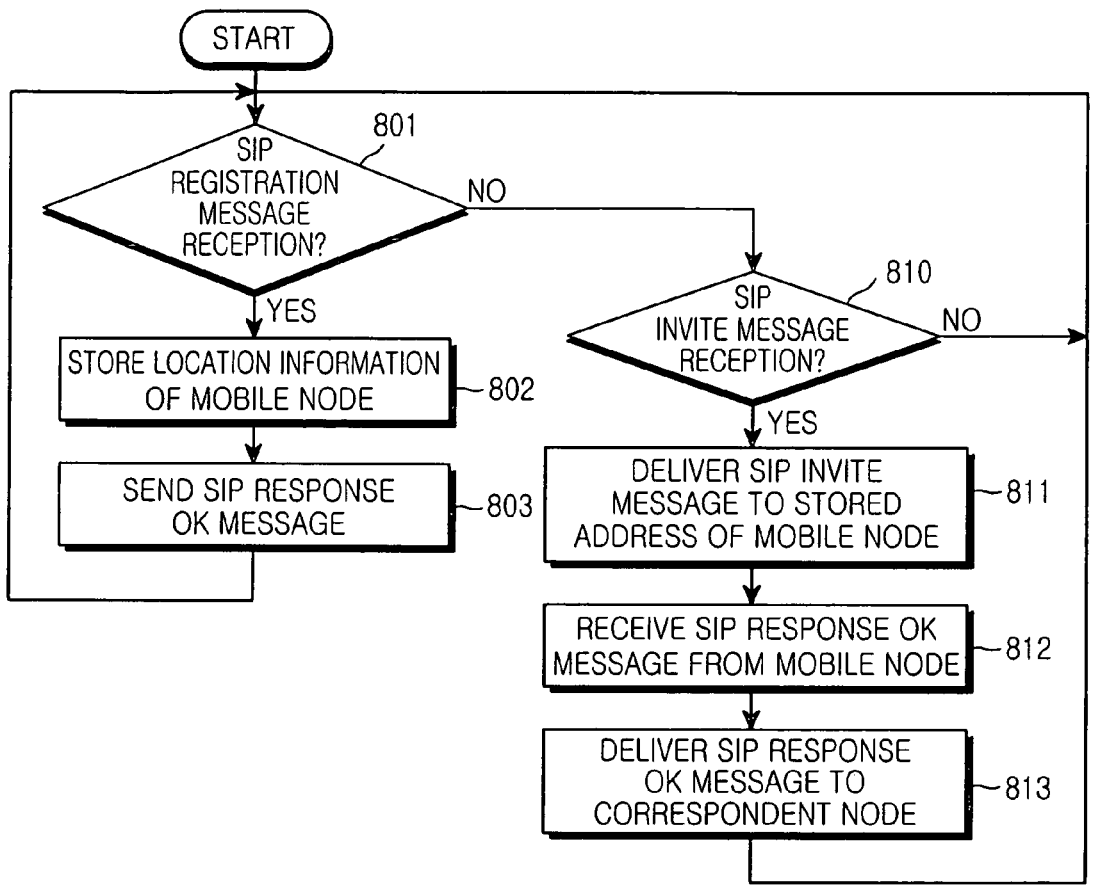
FIG. 8 is a flow chart illustrating an embodiment of operation of a SIP proxy server in accordance with an embodiment of the present invention.

FIG. 8 is a flow chart illustrating an embodiment of operation of a SIP proxy server in accordance with an embodiment of the present invention.

Referring to FIG. 8, the SIP proxy server manages MN information registered therein in a standby state and determines if a SIP registration request message is received from an MN exiting a home network in step 801. If the SIP registration request message is received, the SIP proxy server stores MN location information in step 802, and sends a SIP registration reply message to the MN in step 803.

However, if the SIP registration request message is not received in step 801, the SIP proxy server determines if a SIP invite message is received from a CN in step 810. If a SIP invite message is not received from the CN, the SIP proxy server returns to step 801. However, if the SIP invite message is received, the SIP proxy server delivers the SIP invite message to the stored MN address in step 811. After the SIP proxy server receives a SIP response OK message including a home address from the MN in step 812, it delivers the SIP response OK message to the CN such that the CN can transmit a packet to the home address of the MN in step 813.

Figure 9:
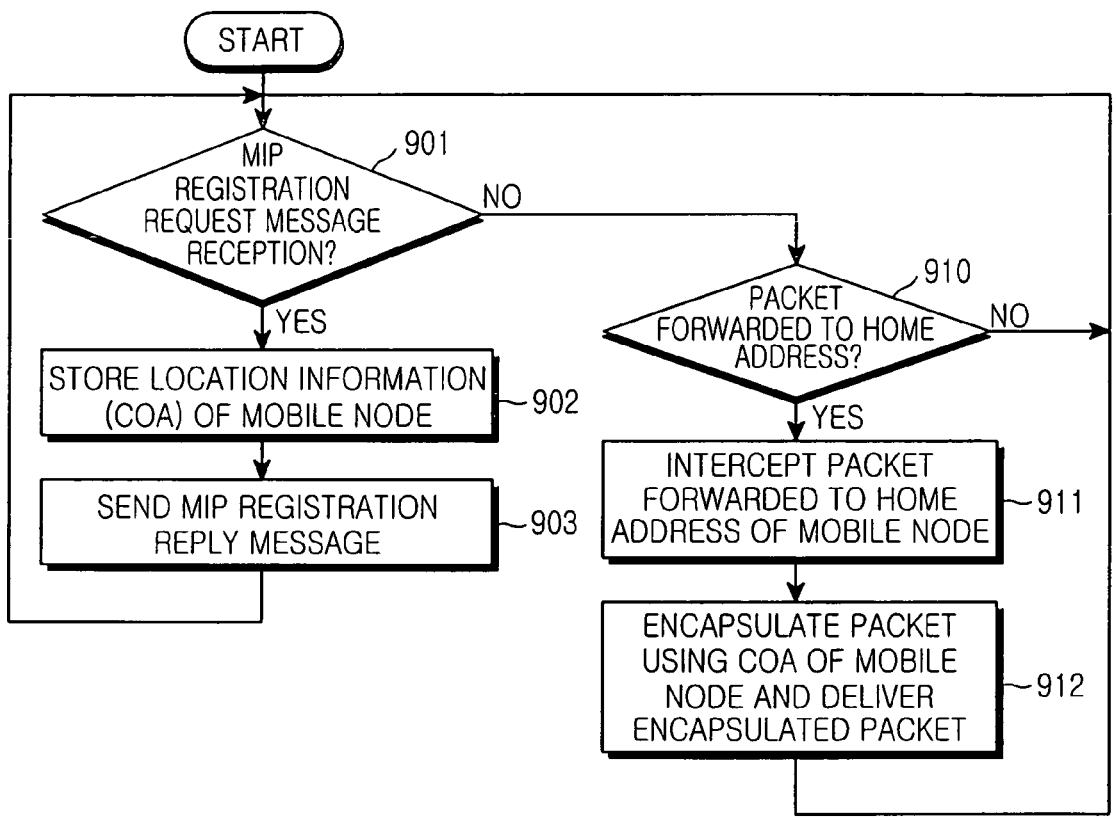
FIG. 9 is a flow chart illustrating an embodiment of operation of a MIP based HA in accordance with an embodiment of the present invention.

FIG. 9 is a flow chart illustrating an embodiment of operation of a MIP based HA in accordance with an embodiment of the present invention.

In step 901, the HA manages MN location information registered in a home network managed thereby in a standby state and determines if a MIP registration request message is received from an MN exiting the home network. If the MIP registration request message is received from the MN, the HA stores a CoA, indicating a current location of the MN, in a location information database in which the CoA is mapped to a home address in step 902. The HA sends a MIP registration reply message to the MN in step 903.

However, if a MIP registration request message is not received in step 901, the HA determines if a packet forwarded to the home address of the MN exiting the home network arrives at the HA in step 910. If the packet forwarded to the home address arrives at the HA, the HA intercepts the packet in step 911, and encapsulates the intercepted packet using the stored CoA indicating the current location of the MN to deliver the encapsulated packet in step 912.

Figure 10:
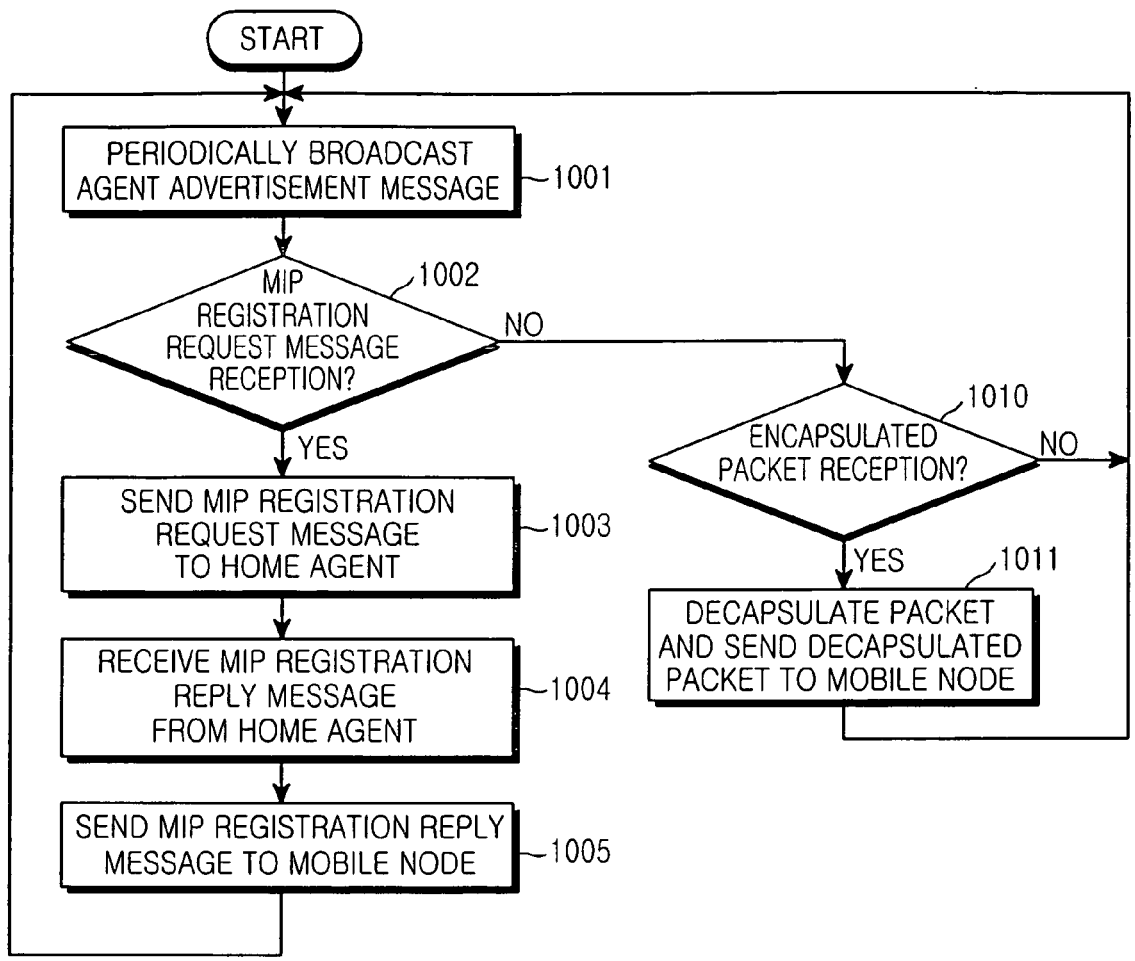
FIG. 10 is a flow chart illustrating an embodiment of operation of a MIP-based Foreign Agent (FA) in accordance with an embodiment of the present invention.

FIG. 10 is a flow chart illustrating an embodiment of operation of a MIP based FA in accordance with an embodiment of the present invention.

In step 1001, the FA periodically broadcasts an agent advertisement message to MNs within a foreign network managed thereby. Then, the FA manages information of the MNs located in its region in a standby state. In step 1002, the FA determines if a MIP registration request message is received from an MN. If the MIP registration request message is received from the MN within a corresponding region, the FA delivers the MIP registration request message to an HA in step 1003. Subsequently, the FA receives a MIP registration reply message from the HA in step 1004 and delivers the received MIP registration reply message to the MN in step 1005.

However, if a MIP registration request message is not received in step 1002, the FA determines if a packet encapsulated using a CoA of the MN is received in step 1010. If the FA does not receive an encapsulated packet, it returns to the standby state and proceeds to step 1001. However, if the FA receives the encapsulated packet, it decapsulates the received packet and delivers the decapsulated packet to the MN in step 1011.

A method for managing IP mobility using operations of the MN, HA, and FA in accordance with an embodiment of the present invention when the MN moves to the FA will be described with reference to the accompanying drawings.

Figure 11:
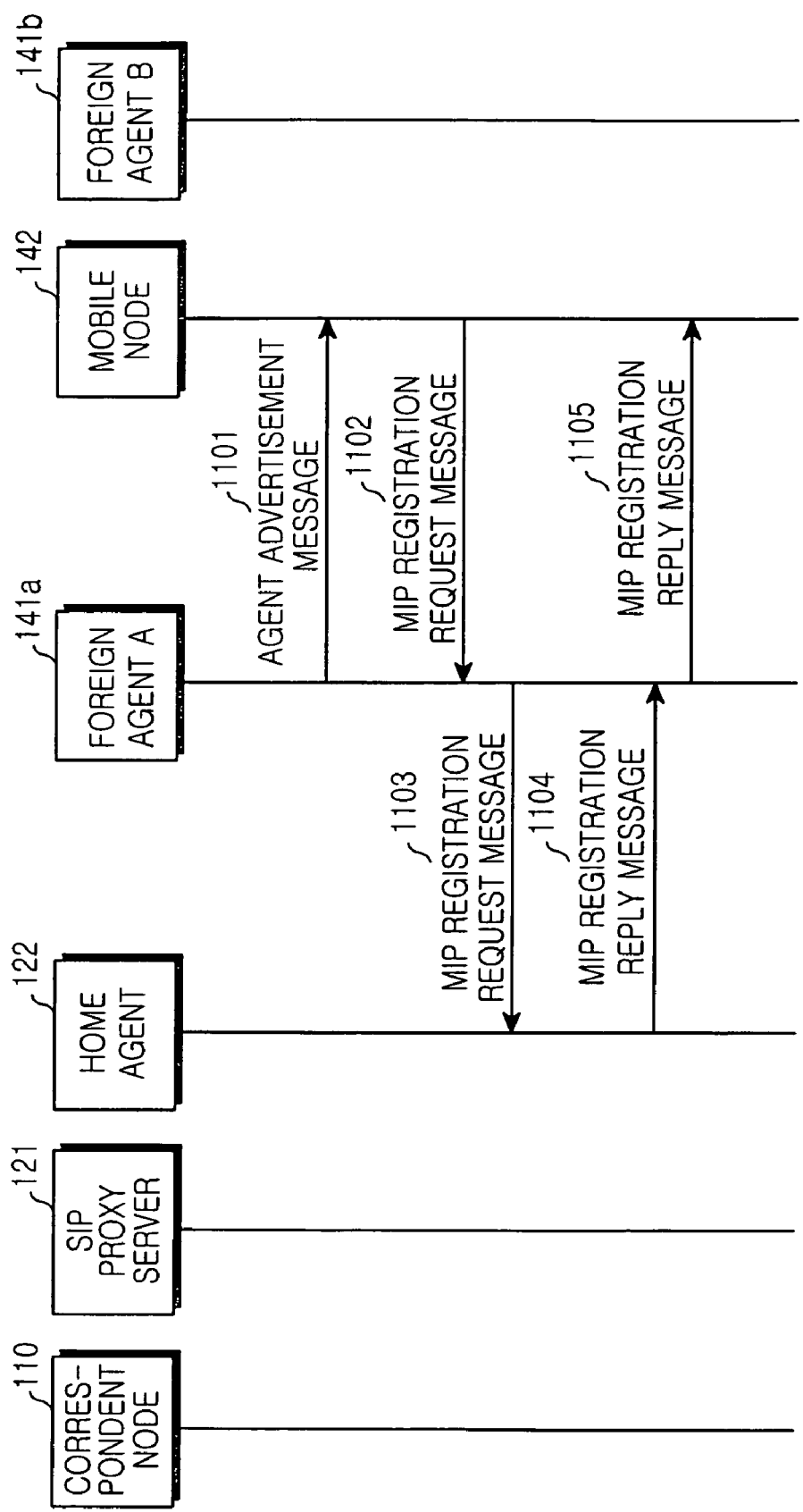
FIG. 11 is a flow chart illustrating an embodiment of a location registration process when the MN moves to an FA A in accordance with an embodiment of the present invention.

FIG. 11 is a flow chart illustrating an embodiment of a location registration process when a MN moves to an FA A in accordance with an embodiment of the present invention.

In step 1101, the FA A periodically sends an agent advertisement message for location registration to MNs within a network. Then, the MN receives a new CoA serving as a new IP address, based on MIP, included in the agent advertisement message according to a management method of the FA A. In step 1102, the FA A receives a location registration request by receiving a MIP registration request message from the MN. In response to the location registration request of the MN, the FA A makes the location registration request of the MN by delivering the MIP registration request message to a HA in step 1103. Accordingly, the HA stores the new CoA of the MN such that the new CoA can be mapped to a home address, and sends a MIP registration reply message to the FA A. The FA A receives the MIP registration reply message from the HA in step 1104, and delivers the MIP registration reply message to the MN in step 1105. Then, the location registration process is terminated.

Figure 3:
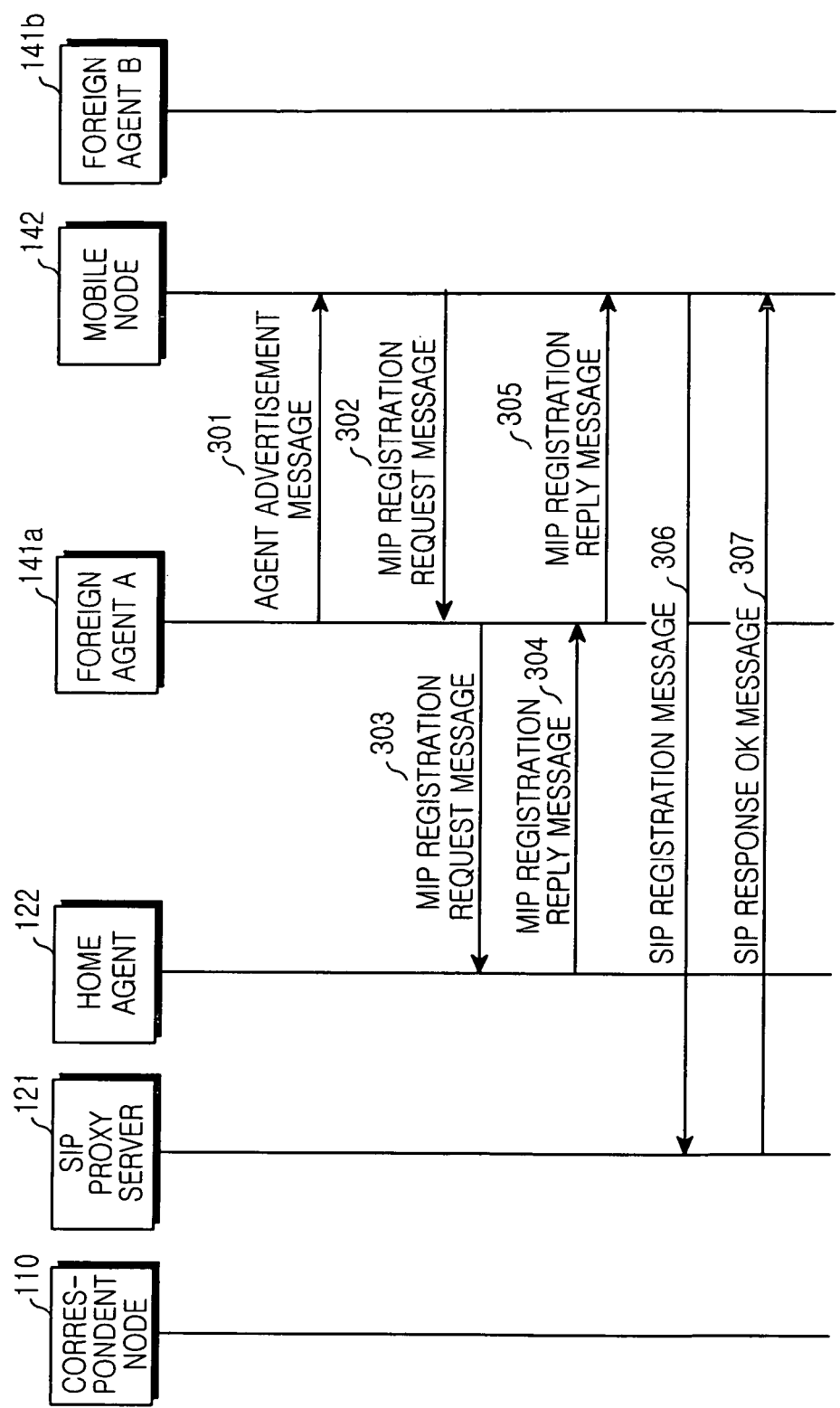
FIG. 3 is a flow chart illustrating a process in which the MN is assigned a new IP address and registers a new location when moving to a foreign network outside a home network in the conventional packet communication network.
Figure 5:
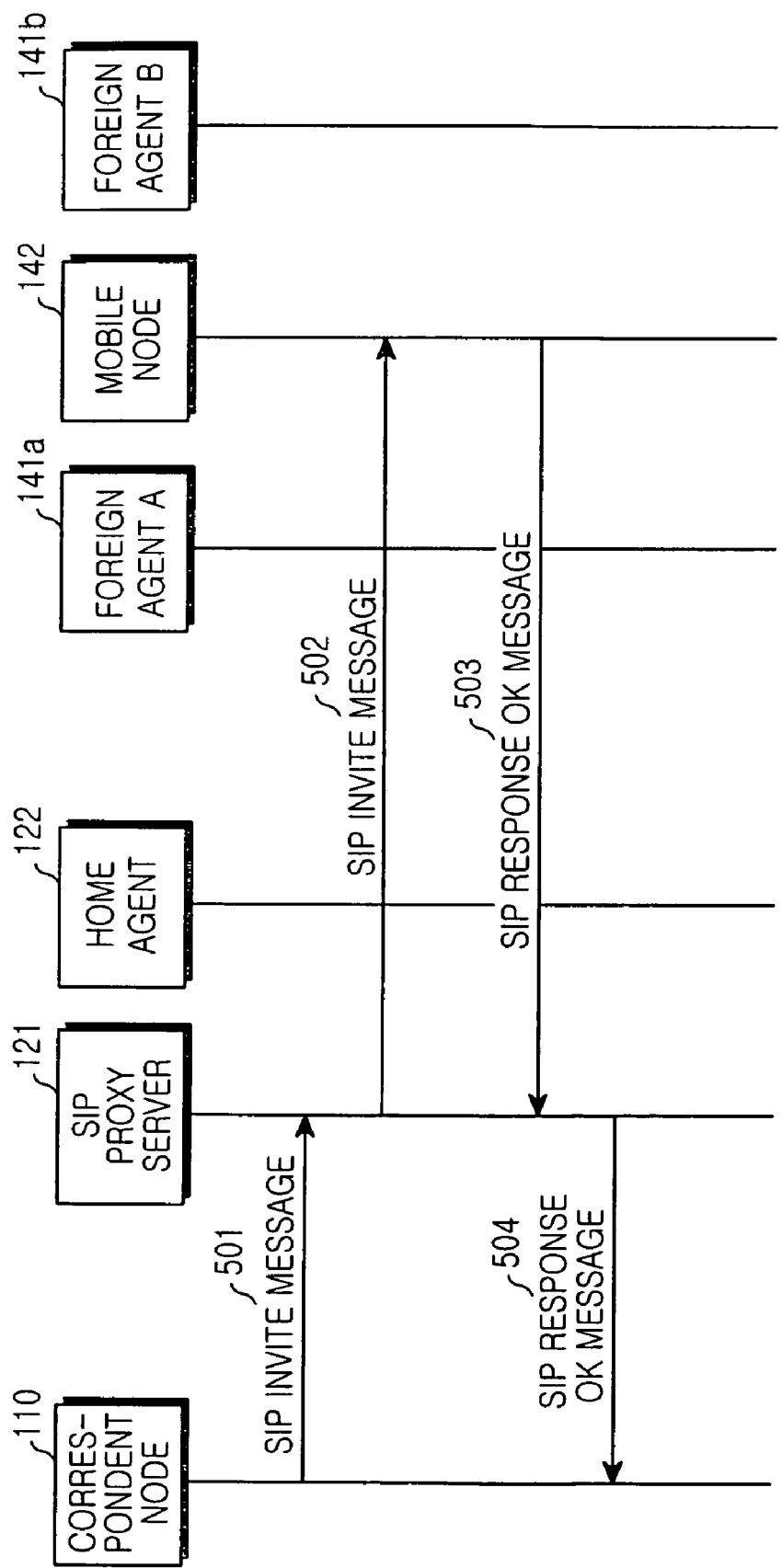
FIG. 5 is a flow chart illustrating a conventional process for establishing a SIP call from a Correspondent Node (CN) to the MN.
Figure 6:
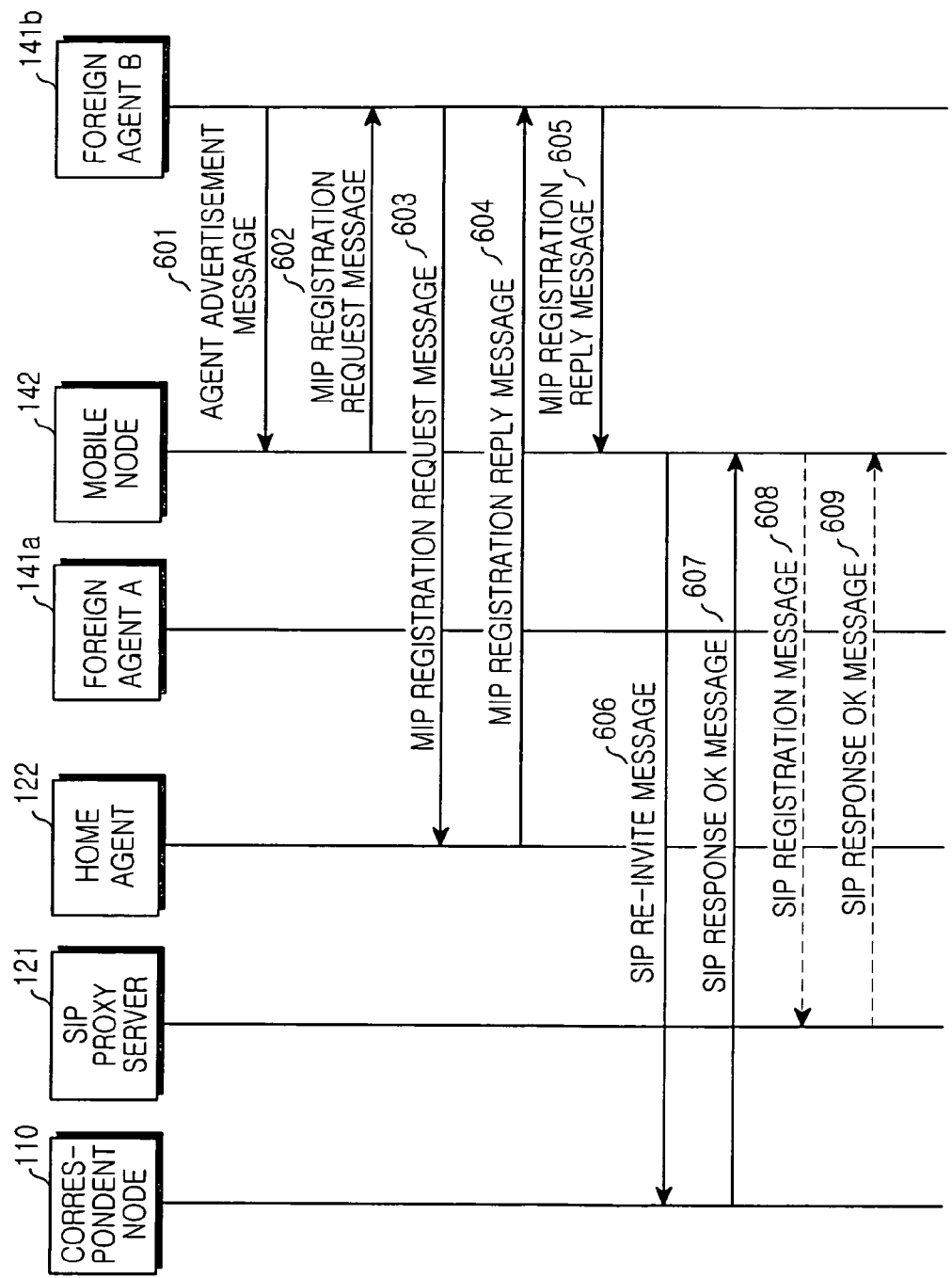
FIG. 6 is a flow chart illustrating a conventional process for supporting mobility of the MN when a call is handed over from a foreign network A to a foreign network B while the MN maintains the call in progress.

In accordance with an embodiment of the present invention, a SIP server stores only the home address of the MN without specially registering changed location information of the MN by omitting steps 306 and 307 as illustrated in FIG. 3.

FIGS. 12A and 12B illustrate the structures of databases for storing subscriber-by-subscriber location information in a MIP based HA and a SIP proxy server in accordance with an embodiment of the present invention.

As illustrated in FIG. 12A, the subscriber-by-subscriber location information in the HA is managed in the form of a table including a MN's home address, a CoA, and a valid lifetime or duration of the CoA. As illustrated in FIG. 12B, a SIP user ID Identification or Identifier (ID) and a home address serving as a unique address of an MN are recorded as the subscriber-by-subscriber location information in the SIP proxy server. Accordingly, the SIP proxy server in accordance with an embodiment of the present invention, is different from the conventional SIP proxy server and does not identify current address information of the MN but determines that the MN stays in the home network without movement.

When the location of the MN is changed according to its mobility, a special SIP location registration process is not performed. In response to a request of a CN, a SIP call is established using a home address of the MN.

Figure 13:
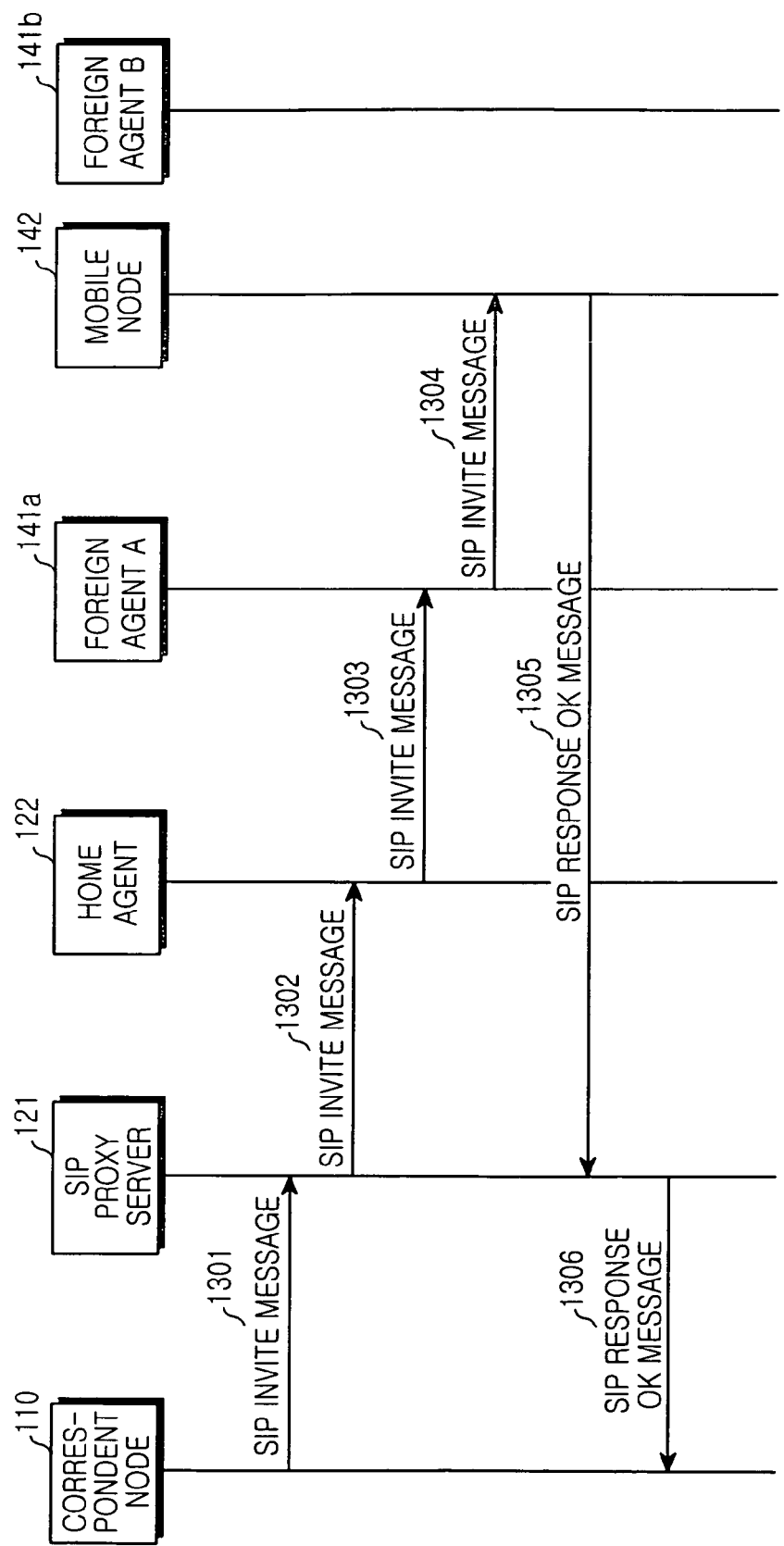
FIG. 13 is a flow chart illustrating an example of a process for establishing a SIP call based on a request of a CN in accordance with an embodiment of the present invention.

FIG. 13 is a flow chart illustrating an example of a process for establishing a SIP call based on a request of a CN in accordance with an embodiment of the present invention.

When the CN sends a SIP invite message for establishing the SIP call to an MN with which the CN desires to communicate, a SIP proxy server receives the SIP invite message in step 1301. The SIP proxy server delivers a SIP invite message to a stored home address of the MN in step 1302. A HA within a home network intercepts the SIP invite message, encapsulates the intercepted SIP invite message using a stored CoA of the MN, and delivers the encapsulated SIP invite message in step 1303. An FA A receives and decapsulates the encapsulated SIP invite message and delivers the decapsulated message to the MN in step 1304. When appropriately receiving the SIP invite message, the MN sends a SIP response OK message to the SIP proxy server in step 1305.

When receiving the SIP response OK message from the MN, the SIP proxy server delivers the received SIP response OK message to the CN in step 1306. At this point, the MN records its own home address in a contact field of the SIP response OK message even when locating in a foreign network. The conventional SIP technology records a CoA indicating a current location of the MN capable of receiving a packet in the contact field. However, regardless of a changed location of the MN, an embodiment of the present invention intentionally records the home address of the MN as if the MN is present in the home network, such that mobility support is easy when the MN moves to a new location while the SIP call of the MN is in progress.

The SIP call is established between the MN and the CN through the above-described process. Because the SIP call is established on the basis of the home address of the MN, the CN sends all SIP packets to the home address of the MN. The SIP packets are encapsulated by the HA using IP encapsulation according to the MIP technology and delivered to the current location of the MN. In this case, encapsulation overhead is required when the SIP packets are encapsulated through the home network of the MN. However, because the packet encapsulation is performed in a wired zone with spare capacity between the HA and the FA, it does not affect the overall system performance.

Figure 14:
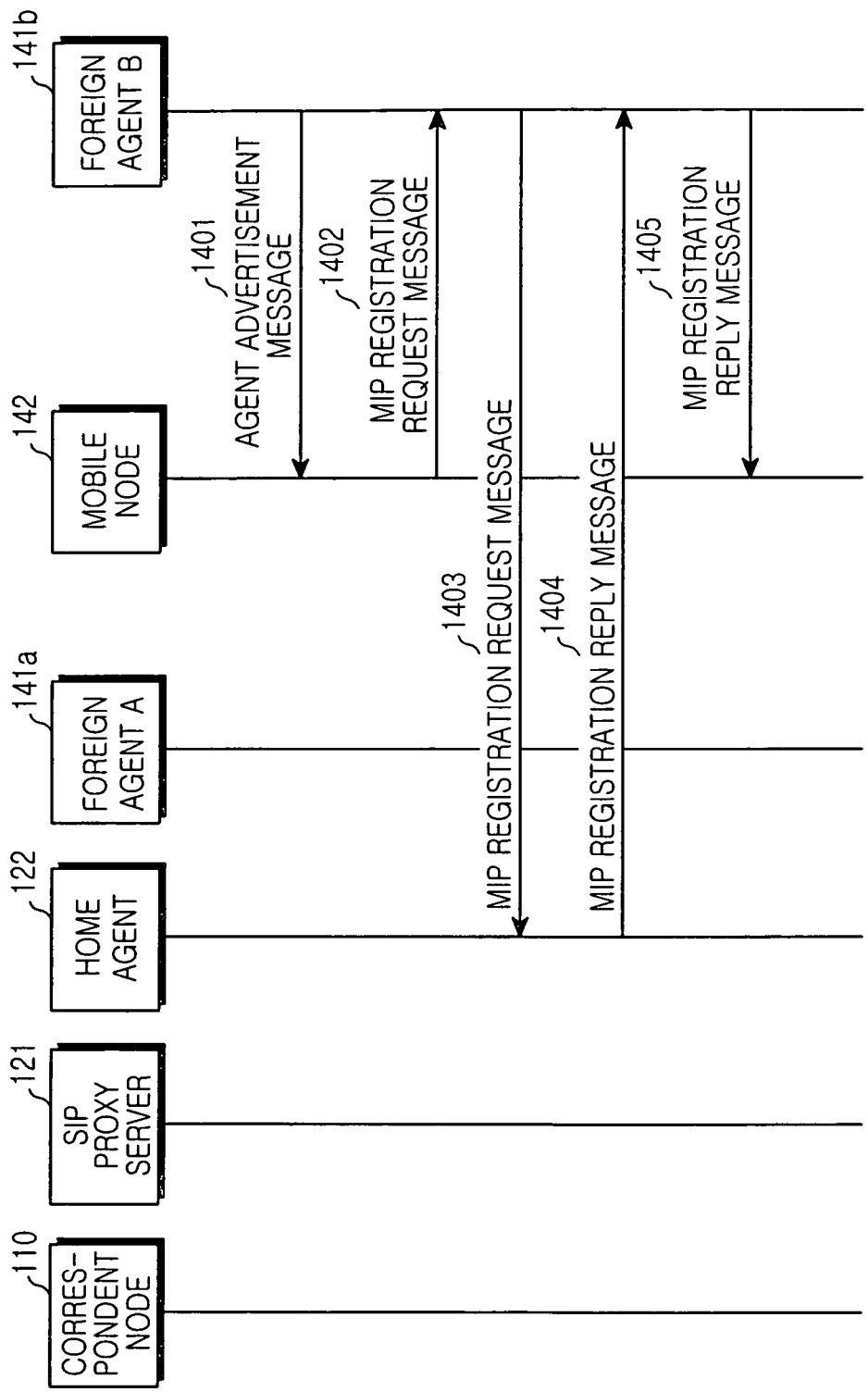
FIG. 14 is a flow chart illustrating an example of a process for supporting mobility of the MN when a call is handed over from a foreign network A to a foreign network B while the MN maintains the call in progress in accordance with an embodiment of the present invention.

FIG. 14 is a flow chart illustrating an example of a process for supporting mobility of a MN when a call is handed over from a foreign network A to a foreign network B while the MN maintains the call in progress in accordance with an embodiment of the present invention.

When moving from the foreign network A to the foreign network B, the MN receives an agent advertisement message periodically broadcast from an FA B and is assigned a CoA serving as a new IP address based on MIP according to an implementation method of the FA B in step 1401. The MN makes a location registration request by sending a MIP registration request message to the FA B in step 1402.

In step 1403, the FA B receives the MIP registration request message from the FA B and sends the received MIP registration request message to a HA. Then, when the HA stores the new CoA such that the CoA is mapped to the home address and sends a MIP registration reply message, the FA B receives the MIP registration reply message in step 1404, and sends the received MIP registration reply message to the MN in step 1405. While the MN moves on the network and performs a MIP location registration process, a CN continuously sends packets to the home address of the MN in a state in which the CN does not identify the presence of MN movement. Accordingly, the packets can be sent from the CN to the MN immediately after the MIP location registration process is performed.

When MIP location registration and SIP location registration all are performed according to the prior art after the MN moves to a new location, many signaling messages must be exchanged and the CN must be notified of a changed IP address of the MN at a handover time, such that a significant handover delay time is incurred. However, because the embodiment of the present invention manages IP mobility by means of a method for sending packets using a home address of the MN without SIP location registration, thereby reducing a handover delay time.

As apparent from the above description, the present invention has a number of advantages. For example, when an MN moves to a new location and a connection point on a network is changed, only MIP location registration is performed. When a SIP call is established, a home address of the MN is recorded in a contact field of a corresponding message. Accordingly, a SIP call setup process and packet communication between the MN and a CN are performed by means of the home address of the MN, such that the number of signaling messages for supporting IP mobility of the MN can be minimized When the CN sends packets only to the home address of the MN regardless of a changed location of the MN, the embodiments of the present invention can reduce the number of signaling messages and a delay time associated with a handover.

Additionally, when the MN moves to a new location while maintaining a connection to a wireless packet network, a simplified location registration process can reduce battery power consumption, and improve use efficiency of the limited wireless network resources.

Although certain embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. A method for supporting Internet Protocol (IP) mobility of a Mobile Node (MN) in a mobile communication system supporting Mobile IP (MIP) and Session Initiation Protocol (SIP), comprising:

performing an initial MIP location registration in a Home Agent (HA) of a home network through a first Foreign Agent (FA) of a first foreign network in which the MN is located;

sending, to a Correspondent Node (CN), a SIP response OK message in which a home address of the MN is recorded when the MN receives a SIP invite message from the CN;

sending, by the CN, a packet to the home address of the MN in a state in which a SIP call of the MN is established; and performing a MIP location registration in the HA through a second FA without a SIP location registration when the MN moves to a second foreign network during the SIP call, wherein the home address indicates a unique IP address assigned by the home network.

2. The method of claim 1, wherein the packet sent to the home address by the CN is encapsulated by the HA using a Care-of Address (CoA) of the MN, and the encapsulated packet is sent to the MN.

3. The method of claim 1, wherein the SIP invite message is delivered from the CN to the MN via a SIP server of the home network to which the HA belongs.

4. The method of claim 1, wherein the SIP invite message is delivered to the MN by the CN identifying the home address of the MN from a redirect server of a home network.

5. The method of claim 1, wherein the home address of the MN is recorded in a contact field of the SIP response OK message.

6. A method for supporting Internet Protocol (IP) mobility of a Mobile Node (MN) in a Session Initiation Protocol (SIP) server of a mobile communication system supporting Mobile IP (MIP) and SIP, comprising:

determining if a SIP invite message is received in a first foreign agent (FA) from a Correspondent Node (CN) corresponding to the MN;

delivering, by the first FA, the SIP invite message to a home address of the MN if the SIP invite message is received;

receiving, by the FA, a SIP response OK message from the MN in which the home address is recorded;

delivering, by the FA, the received SIP response OK message directly to the CN; and performing a MIP location registration in the HA without a SIP location registration when the MN moves to a second foreign network during the SIP call, wherein the home address indicates a unique IP address assigned by the home network.

7. The method of claim 6, wherein the home address of the MN is recorded in a contact field of the SIP response OK message.

8. The method of claim 6, wherein the SIP invite message is encapsulated and sent by a Home Agent (HA) using a Care-of Address (CoA) of the MN, the HA managing the home address.

9. The method of claim 6, wherein the SIP server stores a user Identification or Identifier (ID) of the MN and a home address mapped to the user ID, and manages user location information.

10. A method for supporting Internet Protocol (IP) mobility of a Mobile Node (MN) in a Home Agent (HA) of a mobile communication system supporting Mobile IP (MIP) and Session Initiation Protocol (SIP), comprising:

storing a Care-of Address (CoA) of the MN and a home address mapped to the CoA when the MN performs MIP location registration in the HA of a home network, the CoA being associated with a first foreign network;

receiving a SIP invite message at the HA from a Correspondent Node (CN) corresponding to the MN via a SIP server;

encapsulating the SIP invite message at the HA using the CoA and delivering the encapsulated SIP invite message to the MN;

delivering, to the CN, a SIP response OK message from the HA in which a home address of the MN is recorded;

receiving a packet with a destination serving as the home address from the CN at the HA after a SIP call of the MN receiving the SIP invite message is established;

encapsulating the packet using the CoA at the HA and delivering the encapsulated packet to the MN; and performing the MIP location registration in a state in which the SIP call is maintained without a SIP location registration when a handover to a second foreign network associated with the MN is performed, wherein the home address indicates a unique IP address assigned by the home network.

11. The method of claim 10, further comprising:

re-performing the MIP location registration in a state in which the SIP call is maintained when a handover associated with the MN is performed.

12. A mobile communication system for supporting Mobile Internet Protocol (MIP) and Session Initiation Protocol (SIP), comprising:

at least one Home Agent (HA) for storing a home address of a Mobile Node (MN) and a Care-of Address (CoA) mapped to the home address when a location of the MN is registered in a foreign network, and managing a home network;

a plurality of Foreign Agents (FA) each assigning the CoA, and managing a foreign network communicating with the home network; and the MN recording the home address in a SIP response OK message when a SIP invite message is received from a Correspondent Node (CN), and sending the SIP response OK message directly to the CN, wherein the home address indicates a unique IP address assigned by the home network.

13. The mobile communication system of claim 12, wherein the CN sends a packet to the home address in a state in which a SIP call with the MN is established, and wherein the at least one HA delivers, to the MN, the packet sent to the home address.

14. The mobile communication system of claim 13, wherein the at least one HA encapsulates the SIP invite message using the CoA of the MN and sends the encapsulated SIP invite message to the MN.

15. The mobile communication system of claim 12, wherein the at least one HA stores a changed CoA of the MN and the home address mapped to the changed CoA when the MN moves to another FA in a state in which a SIP call between the MN and the CN is established.

16. The mobile communication system of claim 12, further comprising:

a SIP server for receiving the SIP invite message from the CN to deliver the received SIP invite message to the at least one HA, and receiving the SIP response OK message in which the home address is recorded from the MN to deliver the received SIP response OK message to the CN.

17. The mobile communication system of claim 16, wherein the SIP server stores a user Identification or Identifier (ID) of the MN and a home address mapped to the user ID, and manages user location information.

18. The mobile communication system of claim 12, wherein the home address of the MN is recorded in a contact field of the SIP response OK message.

* * * * *